United States Patent Office 2,812,347
Patented Nov. 5, 1957

2,812,347
ADDUCT OF HEXACHLOROCYCLOPENTADIENE WITH FUMARYL CHLORIDE AND PROCESS FOR MAKING THE SAME

Jack S. Newcomer, Wilson, Paul Robitschek, Buffalo, and Claude Thomas Bean, Jr., Niagara Falls, N. Y., assignors to Hooker Electrochemical Company, Niagara Falls, N. Y., a corporation of New York No Drawing. Application August 16, 1954, Serial No. 450,216

3 Claims. (Cl. 260—468)

This invention relates to a new composition of matter comprising the adduct of hexachlorocyclopentadiene with fumaryl chloride. More particularly, this invention relates to 1,4,5,6,7,7-hexachlorobicyclo-(2.2.1)-5-heptene-2,3-dicarbonyl chloride having the empirical formula $C_9H_2Cl_8O_2$, a melting point of 134 to 136 degrees centigrade, a chlorine content of 66.3 percent and being a white crystalline solid in the pure state. This invention also relates to processes for making the alkali metal salts and the esters of said compound.

The compound of this invention finds particular utility in forming esters of hexachloroendomethylenetetrahydrophthalic acid or 1,4,5,6,7,7-hexachlorobicyclo-(2.2.1)-5-heptene-2,3-dicarboxylic acid which are otherwise difficult to form by the direct esterification of the acid just mentioned. Because of the high reactivity of the compound of this invention it finds particular utility in esterification reactions where the corresponding acid or anhydride reacts too slowly for practical purposes. The compound of this invention is of particular importance as an intermediate for making polyester resins such as shown in U. S. Patents 2,770,700 and 2,779,701 and especially where esterification reactions are frequently prolonged and difficult to carry out at high molecular weight.

The compound of this invention may be prepared by reacting hexachlorocyclopentadiene with fumaryl chloride at an elevated temperature presumably in accordance with the following equation:

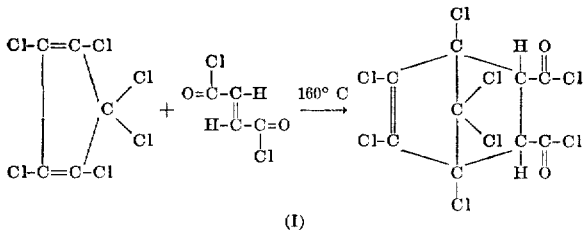

(I)

The di- or mono-alkyl esters, such as the methyl, ethyl, isopropyl, butyl, octyl, lauryl, stearyl, etc. may readily be prepared by reacting the acid chloride of this invention with the corresponding aliphatic alcohol. The aromatic alcohol such as benzyl alcohol, phenyl ethyl alcohol, etc. or the substituted aromatic alcohols such as the halobenzyl alcohols, or glycols such as ethylene, propylene, diethylene, dipropylene, triethylene, etc. may be used in place of the alcohols. The above mentioned compounds are employed in the proper mole ratio at about room temperature or somewhat elevated temperatures presumably in accordance with the following equation:

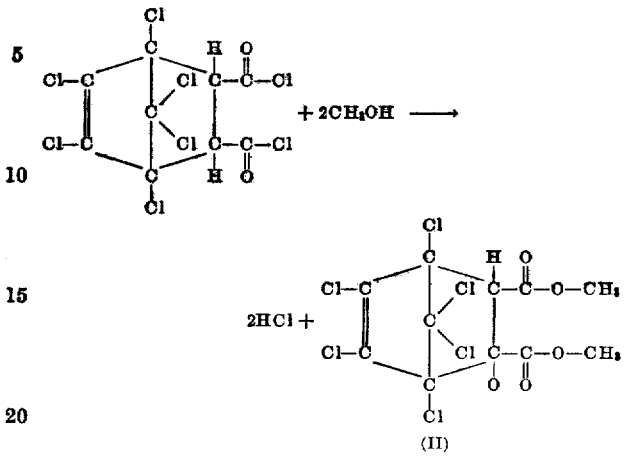

(II)

The corresponding dibasic acid can be prepared by hydrolysis of the acid chloride in water and its salts, such as the alkali metal salts may be prepared by hydrolysis and neutralization using aqueous alkali solutions. The alkali metal salts may also be prepared by reacting an ester of the compound of this invention with an alkali metal hydroxide.

The sodium salt of the acid chloride of this invention may be acidified with hydrochloric acid to form the corresponding dicarboxylic acid, and this in turn may be dehydrated to form the corresponding dicarboxylic anhydride.

The following examples are given to illustrate this invention further and are not to be construed as limiting the invention except as defined in the appended claims:

Example 1

A mixture in the ratio of two gram moles of hexachlorocyclopentadiene to one gram mole of fumaryl chloride was heated in a reaction flask at a temperature of 160 degrees centigrade for a period of four hours in the absence of an extraneous solvent. At the end of this time the reaction mixture was distilled to give unreacted hexachlorocyclopentadiene and an 88.4 percent yield based on the amount of fumaryl chloride used, of a thick yellow liquid having a boiling range of 140 to 150 degrees centigrade at two millimeters mercury pressure. Five hundred and fifteen grams of the distilled liquid were dissolved in a solvent, n-hexane, and crystallization therefrom resulted in the recovery of 442 grams of a white crystalline solid having the empirical formula $C_9H_2Cl_8O_2$ and being the acid chloride of the adduct of hexachlorocyclopentadiene with fumaryl chloride. The melting point of the product was determined to be 134 to 136 degrees centigrade. The product was found to have the following physical properties:

|  | Theoretical | Found |
|---|---|---|
| Chlorine Content (percent) | 66.7 | 66.3 |
| Neutral Equivalent ($H_2O$) | 106.6 | 110 |
| Neutral Equivalent (MeOH) | 213.2 | 220 |

Although the product is a solid in the pure state, it can be distilled as a liquid for purposes of purification.

A five gram sample of the acid chloride of this invention was agitated for several hours at room temperature with 100 milliliters of water and allowed to stand 8 hours. The resulting odorless solid was filtered, washed with water and dried. The hydrolysis product was shown to be 1,4,5,6,7,7-hexachlorobicyclo-(2.2.1)-5-heptene-2,3,-dicarboxylic acid since it had a melting point of between about 210 and 215 degrees centigrade with water evolution, a neutral equivalent of 193, and it did not depress the melting point of a pure specimen of the acid.

The acid chloride of this invention reacted rapidly at room temperature with lower aliphatic alcohols to form esters in accordance with the foregoing Equation II above. For example, a vigorous reaction ensued upon adding 10 grams of the acid chloride to 40 milliliters methanol. After the heat subdued, the methanol was evaporated to leave a white solid having a melting point of between about 76 and 78 degrees centigrade. The dimethyl ester so formed did not depress the melting point of a pure sample of the dimethyl ester of 1,4,5,6,7,7-hexachlorobicyclo-(2.2.1)-5-heptene-2,3-dicarboxylic acid.

The dimethyl ester, formed from the acid chloride, was readily hydrolyzed to the free acid by simply warming with alcoholic caustic, followed by water dilution, acidification with hydrochloric acid, filtration, washing, and drying.

It is apparent from the foregoing specification that the compound of this invention is contemplated for a wide variety of applications primarily because of the reactivity of the compound which has been illustrated, therefore, we do not wish our invention to be limited except as defined in the following claims.

We claim:

1. The adduct of hexachlorocyclopentadiene with fumaryl chloride.

2. The process for making the adduct of hexachlorocyclopentadiene with fumaryl chloride which comprises reacting hexachlorocyclopentadiene with fumaryl chloride at an elevated temperature.

3. The process of making esters of 1,4,5,6,7,7-hexachlorobicyclo-(2.2.1)-5-heptene-2,3-dicarboxylic acid which comprises mixing the reaction product of claim 2 with an organic alcohol and evaporating off any unreacted alcohol.

References Cited in the file of this patent

Prill: Chem. Abs., 41, 2006 (1947).
"Org. Reactions," IV, pp. 14 and 15, J. Wiley, 1948.

UNITED STATES PATENT OFFICE
Certificate of Correction

Patent No. 2,812,347

Jack S. Newcomer, et al.

November 5, 1957

It is hereby certified that error appears in the printed specification of the above numbered patent requiring correction and that the said Letters Patent should read as corrected below.

Column 1, line 37, for "shown in U. S. Patents 2,770,700 and 2,779,701" read —shown in U. S. Patents 2,779,700 and 2,779,701—; column 2, lines 12 to 20, last portion of the equation should appear as shown below instead of as in the patent—

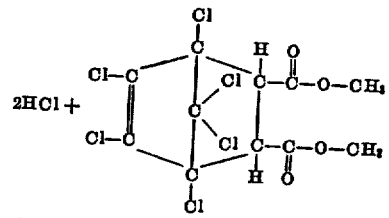

Signed and sealed this 18th day of February 1958.

[SEAL]

Attest:
KARL H. AXLINE,
*Attesting Officer.*

ROBERT C. WATSON,
*Commissioner of Patents.*